US008341133B2

(12) United States Patent
Detlefs et al.

(10) Patent No.: US 8,341,133 B2
(45) Date of Patent: Dec. 25, 2012

(54) COMPRESSED TRANSACTIONAL LOCKS IN OBJECT HEADERS

(75) Inventors: David L. Detlefs, Issaquah, WA (US); Vinod K. Grover, Mercer Island, WA (US); Yosseff Levanoni, Redmond, WA (US); Michael M. Magruder, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 12/163,788

(22) Filed: Jun. 27, 2008

(65) Prior Publication Data

US 2009/0327636 A1 Dec. 31, 2009

(51) Int. Cl.
G06F 7/00 (2006.01)
G06F 17/00 (2006.01)
G06F 13/00 (2006.01)
G06F 13/28 (2006.01)
G06F 15/16 (2006.01)

(52) U.S. Cl. ......... 707/703; 707/657; 707/704; 711/163

(58) Field of Classification Search .................. 707/703, 707/704, 657; 711/163
See application file for complete search history.

(56) References Cited

U.S. PATENT DOCUMENTS

| 5,794,229 | A  | * | 8/1998  | French et al. ................. 707/202 |
| 6,275,863 | B1 | * | 8/2001  | Leff et al. ..................... 707/201 |
| 6,314,417 | B1 | * | 11/2001 | Bennett et al. ................ 707/703 |
| 6,640,245 | B1 | * | 10/2003 | Shen et al. .................... 711/147 |
| 6,880,071 | B2 |   | 4/2005  | Steele et al. |
| 7,808,507 | B1 | * | 10/2010 | Van Dyke et al. ............ 711/163 |
| 7,882,084 | B1 | * | 2/2011  | Amdahl ........................ 707/693 |
| 2005/0097103 | A1 | * | 5/2005  | Zane et al. ........................ 707/6 |
| 2005/0256907 | A1 | * | 11/2005 | Novik et al. .................. 707/200 |
| 2006/0085588 | A1 |   | 4/2006  | Rajwar et al. |
| 2007/0028056 | A1 |   | 2/2007  | Harris |
| 2007/0118579 | A1 |   | 5/2007  | Hudson |
| 2007/0143741 | A1 | * | 6/2007  | Harris ........................... 717/121 |
| 2007/0156780 | A1 |   | 7/2007  | Saha et al. |
| 2007/0156994 | A1 | * | 7/2007  | Akkary et al. ................ 711/167 |
| 2008/0021934 | A1 | * | 1/2008  | Hudson et al. ................ 707/203 |
| 2009/0106281 | A1 | * | 4/2009  | Marwah et al. ............... 707/101 |

OTHER PUBLICATIONS

Harris, et al., "Optimizing Memory Transactions", Jun. 2006, 12 pages.
Shavit, et al, "Software Transactional Memory", Aug. 1995, 34 pages.
McDonald, et al., "Architectural Semantics for Practical Transactional Memory", May 2006, 12 pages.
Robert Ennals, "Software Transactional Memory Should Not Be Obstruction-Free", Intel Research Cambridge, 2006, 11 pages.
Moore, et al., "LogTM: Log-based Transactional Memory", Feb. 11-15, 2006, 12 pages.
Marathe, et al, "Design Tradeoffs in Modern Software Transactional Memory Systems", 2004, 7 pages.

* cited by examiner

Primary Examiner — Greta Robinson
Assistant Examiner — Brian E. Weinrich (57) ABSTRACT

A software transactional memory system is provided that generates and stores compressed transactional locks in a portion of object headers. The software transactional memory system allocates preferred write log memory with a predefined size of memory that corresponds to a number of bits in the compressed transactional locks. The compressed transactional locks identify write log entries in corresponding write logs in the preferred write log memory. If the preferred write log memory becomes full, additional write log memory is allocated for write log entries and subsequent transactional locks are stored uncompressed in an auxiliary memory. A pointer that may be used to locate the uncompressed transactional lock is stored in the header. If an object header with a compressed transactional lock is needed for another use, the compressed transactional lock is uncompressed and stored in the auxiliary memory. A pointer that may be used to locate the uncompressed transactional lock is stored in the header.

13 Claims, 6 Drawing Sheets

COMPRESSED TRANSACTIONAL LOCKS IN OBJECT HEADERS

BACKGROUND

Computer programs may be written to allow different portions (e.g., threads) of the program to be executed concurrently. In order to execute different portions of the program concurrently, the computer system or the program typically includes some mechanism to manage the memory accesses of the different portions to ensure that the parts access common memory locations in the desired order.

Transactional memory systems allow programmers to designate transactions in a program that may be executed as if the transactions are executing in isolation (i.e., independently of other transactions and other sequences of instructions in the program). Transaction memory systems manage the memory accesses of transactions by executing the transactions in such a way that the effects of the transaction may be rolled back or undone if two or more transactions attempt to access the same memory location in a conflicting manner. Transaction memory systems may be implemented using hardware and/or software components.

Transactional memory systems may use mechanisms to designate ownership of a memory location. These mechanisms, however, typically take up storage space and may increase the overhead that transaction memory systems add to the execution of programs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A software transactional memory system is provided that generates and stores compressed transactional locks in a portion of object headers. The software transactional memory system allocates preferred write log memory with a predefined size of memory that corresponds to a number of bits in the compressed transactional locks. The compressed transactional locks identify write log entries in corresponding write logs in the preferred write log memory. If the preferred write log memory becomes full, additional write log memory is allocated for write log entries and subsequent transactional locks are stored uncompressed in an auxiliary memory. A pointer that may be used to locate the uncompressed transactional lock is stored in the header. If an object header with a compressed transactional lock is needed for another use, the compressed transactional lock is uncompressed and stored in the auxiliary memory. A pointer that may be used to locate the uncompressed transactional lock is stored in the header.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
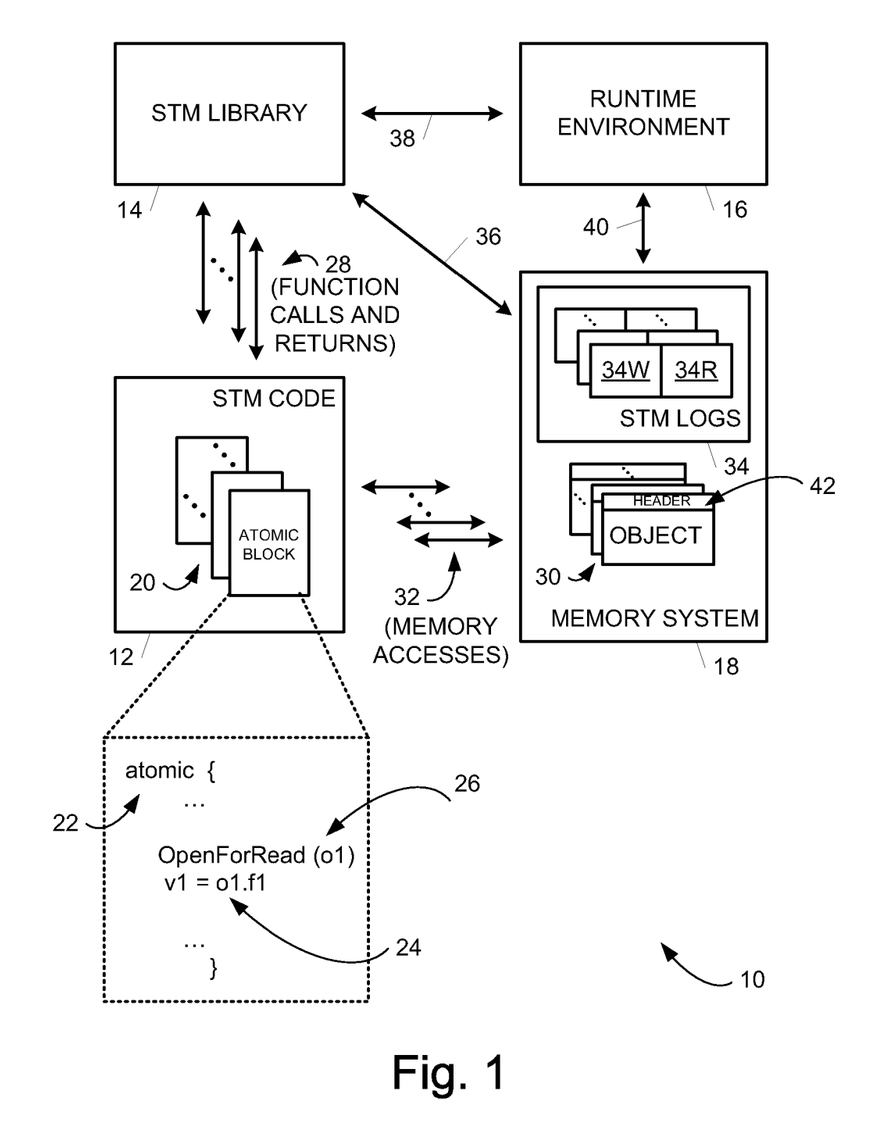
FIG. 1 is a block diagram illustrating an embodiment of a software transactional memory system that uses compressed transactional locks.

FIG. 1 is a block diagram illustrating an embodiment of a software transactional memory (STM) system 10 that uses compressed transactional locks.

STM system 10 represents a runtime mode of operation in a computer system, such as computer system 100 shown in FIG. 6 and described in additional detail below, where the computer system is executing instructions to run STM code 12. STM system 10 includes STM code 12, an STM library 14, a runtime environment 16, and a memory system 18. STM system 10 is configured to manage the execution of STM transactions that represent atomic blocks 20 in STM code 12 to allow blocks 20 to be executed atomically and, if desired, rollback or undo changes made by blocks 20. To do so, STM system 10 tracks memory accesses by blocks 20.

STM code 12 includes a set of one or more atomic blocks 20. Each block 20 includes a sequence of instructions that is designed to execute atomically, i.e., as if the sequence is executing in isolation from other code in STM code 12.

Each block 20 includes an atomic block designator 22 that indicates that a corresponding portion of STM code 12 is an atomic block 20. Each block 20 includes zero or more memory accesses 24 that read from and/or write to objects 30 in memory system 18 as indicated by arrows 32. Blocks 20 also include invocations of STM primitives 26, added by a compiler such as a compiler 124 shown in FIG. 6 and described in additional detail below, that call functions in STM library 14, and STM primitives 26 of STM library 14 return results to blocks 20 as indicated by function calls and returns 28. STM primitives 26 callable by blocks 20 include management primitives that implement start, commit, abort, and retry functions in STM library 14. A block 20 calls the start function to initiate the management of an STM transaction corresponding to the block 20 by STM library 14. A block 20 calls the commit function to finalize the results of the block in memory system 18, if successful. A block 20 calls the abort function to roll back or undo the results of the block in memory system 18. A block 20 calls the retry function to retry the block 20.

STM primitives 26 of each block 20 also include memory access primitives that lock objects 30 for reading and/or writing. Prior to a block 20 accessing a memory location 30 in a memory system 18, block 20 issues a function call to open the memory location 30 and thereby obtains a lock to the memory location 30. A memory location 30 may be opened for reading and/or opened for writing.

In one embodiment, each STM memory access primitive operates to lock objects 30 that include an object or static block in memory system 18. In other embodiments, each STM memory access primitive operates to lock other sizes or granularities of memory system 18.

STM library 14 includes instructions executable by the computer system in conjunction with runtime environment 16 to implement a transactional memory system. STM library 14 is configured to operate in a direct write mode of operation and/or a buffered write mode of operation. STM library 14 manages STM logs 34 which include a write log 34W and a read log 34R for each block 20 currently being executed.

In the direct write mode of operation, STM library 14 causes memory accesses 32 by each block 20 to be made directly to objects 30 in memory system 18. Each write access 32 executed by block 20 writes directly to a memory location 30 indicated by the write access. Each read access 32 executed by block 20 reads directly from a memory location 30 indicated by the read access. STM library 14 adds each write and read access 32 from a block 20 to logs 34W and 34R, respectively, as indicated by an arrow 36 and uses log 34W to roll back the block 20 in response to block 20 being aborted. STM library 14 also uses log 34R to validate read accesses and for retry operations.

In the buffered write mode of operation, STM library 14 causes write accesses 32 by each block 20 to be made to shadow copies (not shown) of objects 30 in memory system 18. Each write access 32 executed by a block 20 writes directly to a shadow copy indicated by the write access. STM library 14 causes read accesses 32 that occur after a designated memory location 30 has been opened for writing by each block 20 to be made from the shadow copies. STM library 14 causes read accesses 32 that occur before a designated memory location 30 has been opened from writing by each block 20 to be made directly from objects 30 in memory system 18. STM library 14 adds each write and read access 32 from a block 20 to logs 34W and 34R, respectively, as indicated by arrow 36 and uses log 34W to cause shadow copies to be stored into objects 30 in response to block 20 committing successfully. STM library 14 discards the shadow copies in response to block 20 being aborted. STM library 14 also uses log 34R to validate read accesses and for retry operations.

Runtime environment 16 may be any suitable combination of runtime libraries, an operating system (OS) functions, such as functions provided by an OS 122 shown in FIG. 6 and described in additional detail below, and/or compiler functions, such as functions provided by a compiler 124 shown in FIG. 6 and described in additional detail below.

Memory system 18 includes any suitable type, number, and configuration of volatile or non-volatile storage devices configured to store instructions and data. The storage devices of memory system 18 represent computer readable storage media that store computer-executable instructions including STM code 12 and STM library 14. The instructions are executable by the computer system to perform the functions and methods of STM code 12 and STM library 14 herein. Examples of storage devices in memory system 18 include hard disk drives, random access memory (RAM), read only memory (ROM), flash memory drives and cards, and magnetic and optical disks.

Figure 2A:
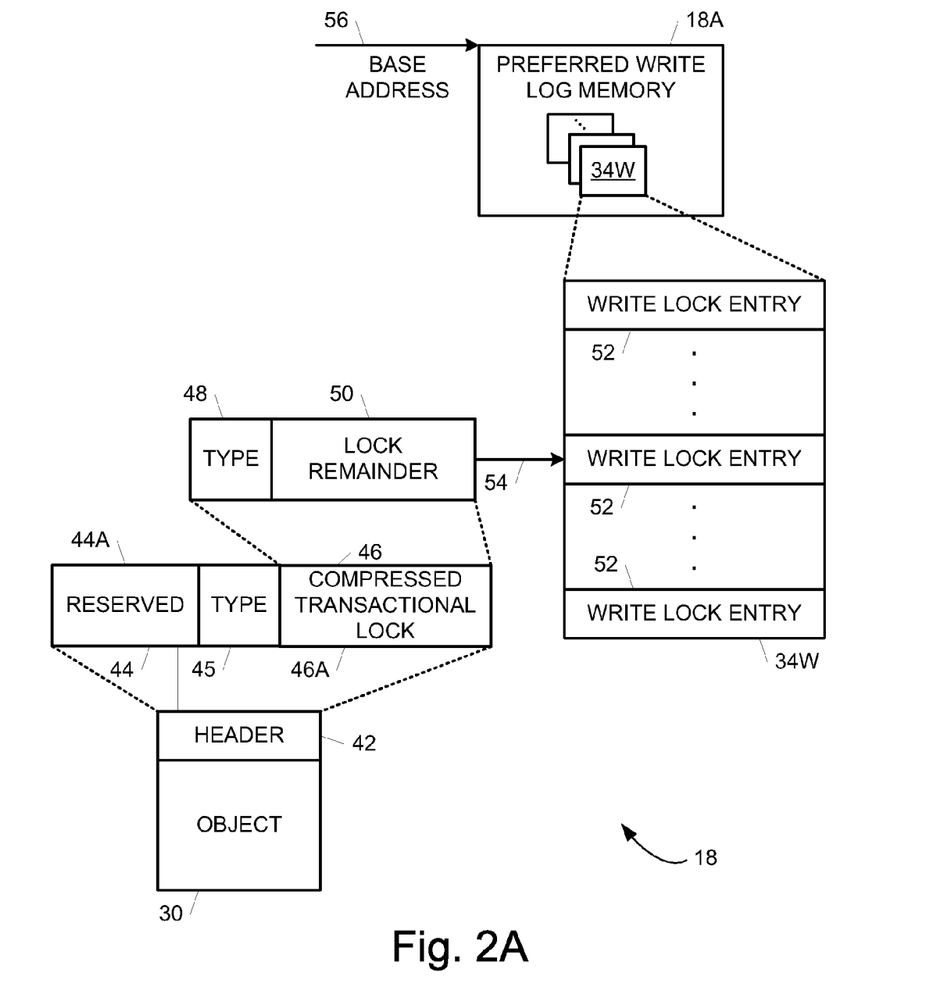
FIGS. 2A-2B are block diagrams illustrating embodiments of creating and storing transactional locks and write log entries.
Figure 2B:
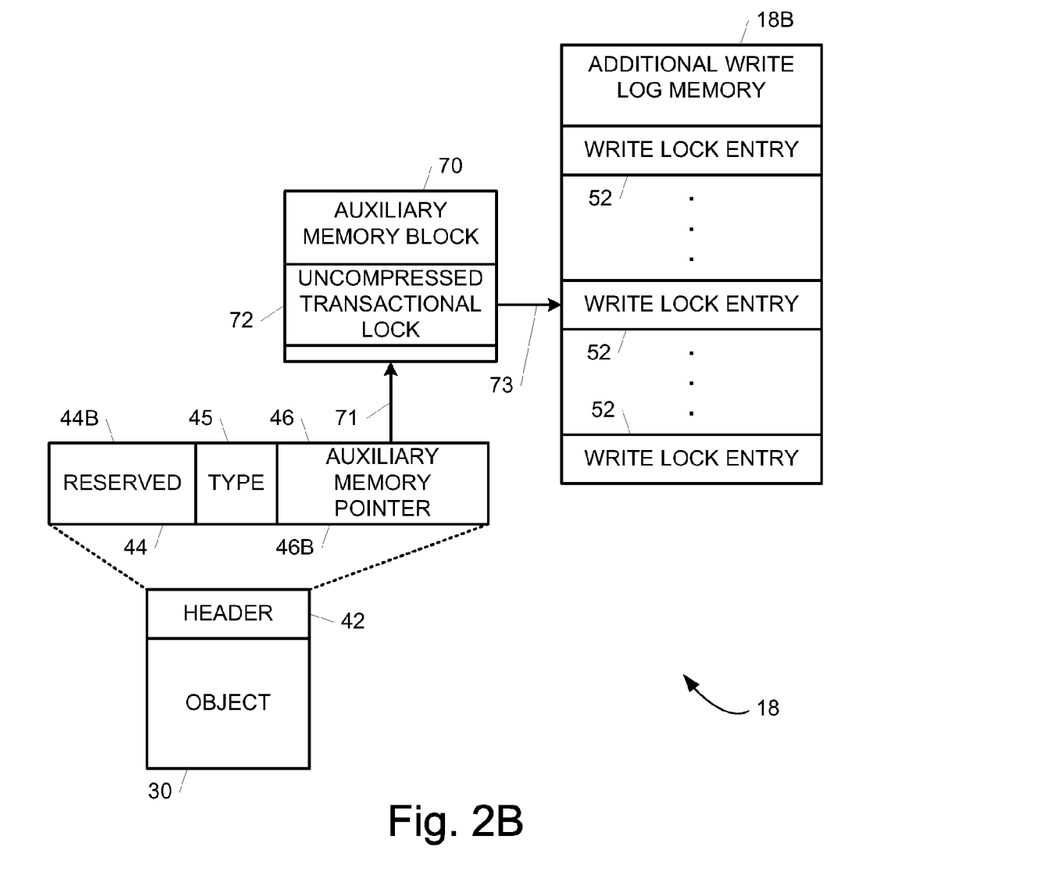

STM system 10 is configured to generate and store compressed transactional locks 46A in a portion 46 of headers 42 of objects 30. FIGS. 2A-2B are block diagrams illustrating embodiments of creating and storing compressed transactional locks 46A, uncompressed transactional locks 72, and write log entries 52. STM system 10 allocates preferred write log memory 18A with a predefined size of memory that corresponds to a number of bits in the compressed transactional locks 46A. Compressed transactional locks 46A identify write log entries 52 in corresponding write logs 34W in preferred write log memory 18A. If preferred write log memory 18A becomes full, additional memory 18B is allocated for write log entries 52 and a subsequent transactional lock is stored as an uncompressed transactional lock 72 in an auxiliary memory block 70 as shown in FIG. 2B. An auxiliary memory pointer 46B that may be used to locate the uncompressed transactional lock 72 is stored in header 42 instead of the compressed transactional lock 46A. If an object header 42 with a compressed transactional lock 46A is needed for another use, the compressed transactional lock 46A is uncompressed and stored as an uncompressed transactional lock 72 in the auxiliary memory block 70. An auxiliary memory pointer 46B that may be used to locate the uncompressed transactional lock 72 is stored in header 42 but may be stored in a different set of bits of header 42 than compressed transactional lock 46A.

Each object header 42 has a predefined size of memory as specified by runtime environment 16 and/or an operating system, such as OS 122 shown in FIG. 6 and described in additional detail below. For example, each header 42 may have a size of four bytes in a 32 bit operating system or a size of eight bytes in a 64 bit operating system. Each header 42 may be stored at a known location relative to a corresponding object 30. In one embodiment, each header 42 may be stored in a location immediately before or after a corresponding object 30. Accordingly, a header 42, and the compressed transactional lock 46A stored therein, may be accessed using the base address of a corresponding object 30 and a known size of the header 42. In other embodiments, each header 42 may be stored in other known locations relative to a corresponding object 30 or other locations that may be determined from the base address of an object 30.

Each header 42 may have uses to an operating system and/or runtime environment 16 in addition to the uses by STM system 10. To minimize interfering with uses by the operating system and/or runtime environment 16, STM system 10 treats a portion 44 of each header 42 as reserved and does not use reserved portion 44. Reserved portion 44 may be used by the operating system and/or runtime environment 16 continuously or with sufficient frequency that would cause conflicts with the storage of other information, such as compressed transactional locks 46A, in reserved portion 44. A type indicator 45 in header 42 indicates whether portion 46 in header 42 and a compressed transactional lock 46A or an auxiliary memory pointer 46B.

A reserved portion 44A may be used where header 42 includes a compressed transactional lock 46A, and a reserved portion 44B may be used where header 42 includes an auxiliary memory pointer 46B. In one embodiment, reserved portion 44A includes more bits of header 42 than reserved portion 44B and compressed transactional lock 46A includes fewer bits of header 42 than auxiliary memory pointer 46B.

If a portion 46 of a header 42 is unused by the operating system and runtime environment 16, STM system 10 stores a compressed transactional lock 46A into the portion 46 of header 42 and sets type indicator 45 to indicate that portion 46 includes a compressed transactional lock 46A. The operating system and/or runtime environment 16 may occasionally use these portions 46 of headers 42. Accordingly, STM system 10 causes compressed transactional locks 46A to be uncompressed and moved to auxiliary memory block 70 if the operating system and/or runtime environment 16 uses the portion of a header 42 that includes compressed transactional locks 46A as described in additional detail below with reference to FIGS. 4A-4B and 5.

In one embodiment, each compressed transactional lock 46A includes 26 bits, each reserved portion 44A includes 5 bits, and each type indicator 45 includes 1 bit. In other embodiments, each compressed transactional lock 46A, each reserved portion 44A, and each type indicator 45 include other numbers of bits.

Each compressed transactional lock 46A includes a type indicator 48 and a lock remainder 50. Each type indicator 48 indicates whether a corresponding lock remainder 50 represents a write lock on a corresponding object 30 or a version number of a corresponding object 30. If the type indicator 48 indicates a write lock, the lock remainder 50 represents an encoded pointer that identifies a corresponding write log entry 52 in preferred write log memory 18A as indicated by an arrow 54. Each encoded pointer is generated as a difference between an address of a corresponding write log entry 52 and a base address 56 of preferred write log memory 18A in one embodiment. In other embodiments, each encoded pointer may be generated using other functions involving base address 56 and the address of a corresponding write log entry 52.

If a portion 46 of a header 42 is used by the operating system or runtime environment 16, then STM system 10 causes the information stored in portion 46 by the operating system or runtime environment 16 (not shown) to be moved to auxiliary memory block 70. STM system 10 stores uncompressed transactional lock 72 along with this information in auxiliary memory block 70 and stores an auxiliary memory pointer 46B that locates the auxiliary memory block 70 (and thus the uncompressed transactional lock 72 and the moved information) into header 42 as indicated by an arrow 71. STM system 10 sets type indicator 45 to indicate that portion 46 includes an auxiliary memory pointer 46B rather than a compressed transactional lock 46A. Uncompressed transactional lock 72 identifies a corresponding write log entry 52 in additional write log memory 18B as indicated by an arrow 73.

In one embodiment, each uncompressed transactional lock 72 includes 32 bits and each auxiliary memory pointer 46B includes 26 bits and each reserved portion 44B includes 6 bits. In other embodiments, each uncompressed transactional lock 72, each auxiliary memory pointer 46B, and each reserved portion 44B includes other numbers of bits.

Each auxiliary memory pointer 46B is generated as a function of a corresponding write log entry 52 in additional write log memory 18B and an indicator of the location of additional write log memory 18B. In one embodiment, auxiliary memory block 70 represents a SyncBlock provided by runtime environment 16 which includes Common Language Runtime (CLR). In this embodiment, each auxiliary memory pointer 46B is generated as an index into an array of SyncBlocks. In other embodiments, other types of auxiliary memory block 70 may be used to allow auxiliary memory pointer 46B to identify uncompressed transactional locks 72.

Figure 3:
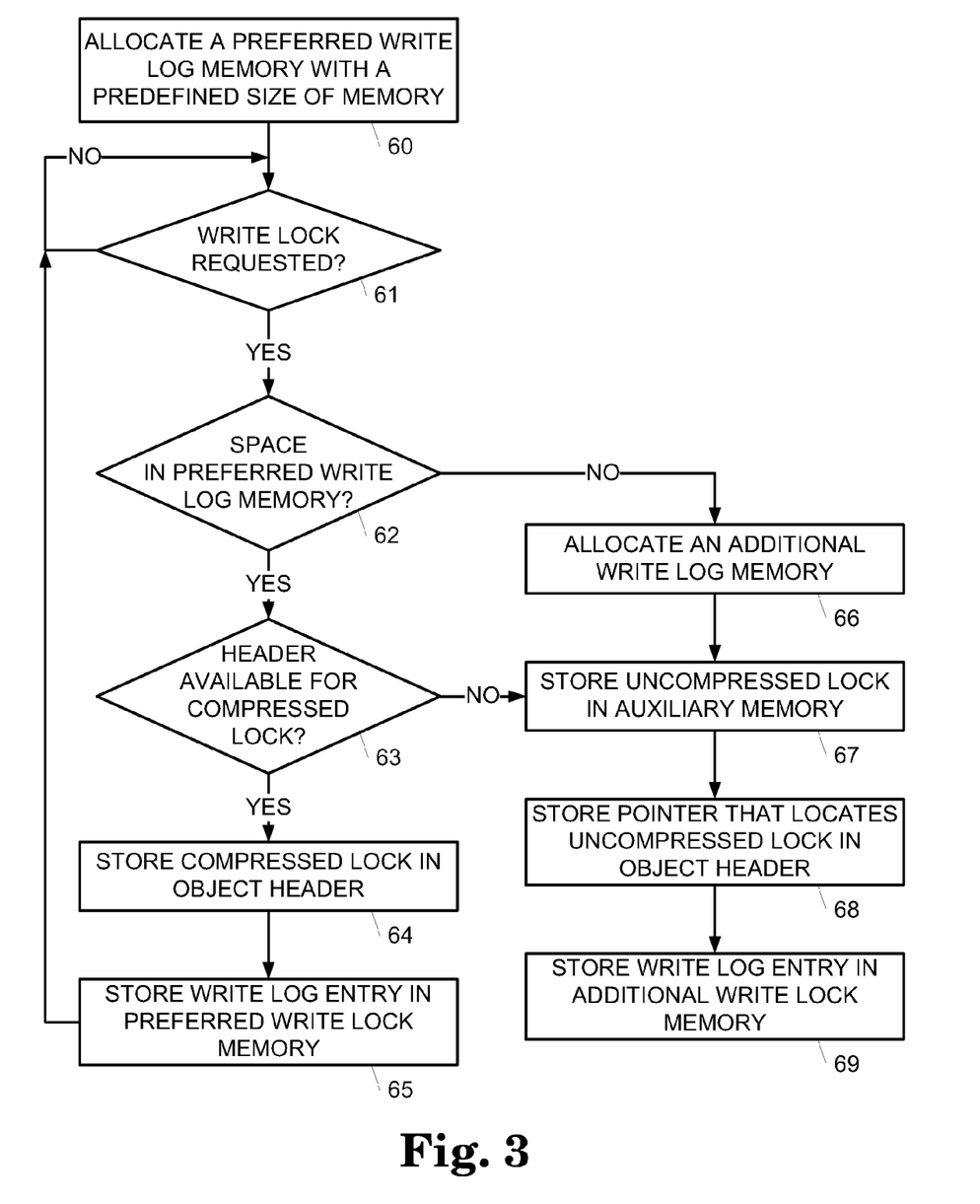
FIG. 3 is a flow chart illustrating an embodiment of a method for creating and storing transactional locks and write log entries.

FIG. 3 is a flow chart illustrating an embodiment of a method for creating and storing transactional locks 46A and 72 and write log entries 52 as performed by STM system 10. As shown in FIG. 3, STM system 10 allocates preferred write log memory 18A with a predefined size of memory as indicated in a block 60. As noted above, the predefined size of memory corresponds to a number of bits in compressed transactional locks 46A to allow compressed transactional locks 46A to be stored in portion 46 of header 42. In one embodiment, the predefined size of memory of preferred write log memory 18A is 32 megabytes (MB). In addition, the number of bits in compressed transactional locks 46A is 26. Each type indicator 48 includes 1 bit and each encoded pointer includes 25 bits in each compressed transactional lock 46A in this embodiment. Accordingly, encoded pointers 50 may be used to address 2^25 unique addresses which corresponds to the 32 MB memory size of preferred write log memory 18A. In other embodiments, other predefined sizes of memory and granularity/alignment variations of preferred write log memory 18A and other numbers of bits of compressed transactional locks 46A may be used. For example, the predefined size of memory of preferred write log memory 18A may be 256 megabytes (MB) where write log entries 52 are aligned on 8 byte boundaries and each encoded pointer includes 25 bits.

In response to each request for a write lock from STM code 12 (i.e., an invocation to open an object 30 for writing) as indicated in a block 61, STM system 10 determines whether memory space is available in preferred write log memory 18A as indicated in a block 62.

If memory space is available in preferred write log memory 18A, STM system 10 determines whether a header 42 for the object 30 corresponding to the requested write lock is available for a compressed transactional lock 46A as indicated in a block 63. The header 42 is available for the compressed transactional lock 46A if header 42 is not storing an auxiliary memory pointer 46B. If the header 42 is storing an auxiliary memory pointer 46B, then STM system 10 performs the functions of blocks 67 through 69 as described below.

If the header 42 is available for the compressed transactional lock 46A, STM system 10 stores the compressed transactional lock 46A in a portion 46 of an object header 42 as indicated in a block 64 and stores a corresponding write log entry 52 in a corresponding write log 34W in preferred write log memory 18A as indicated by a block 65. STM system 10 creates the compressed transactional lock 46A by subtracting base address 56 of preferred write log memory 18A from the address of the corresponding write log entry 52 to generate encoded pointer and by setting type indicator 48 to indicate that the compressed transactional lock 46A is a write lock. STM system 10 creates write log entry 52 to include any suitable information that allows the state of object 30 to be restored if the block 20 that initiated the write lock aborts.

If memory space is not available in preferred write log memory 18A, STM system 10 allocates additional write log memory 18B as indicated in a block 66. STM system 10 stores an uncompressed transactional lock 72 in auxiliary memory block 70 as indicated in a block 67 and stores an auxiliary memory pointer 46B that locates the auxiliary memory 70 (and thus the uncompressed transactional lock 72) in portion 46 of header 42 as indicated in a block 68. STM system 10 stores a corresponding write log entry 52 in additional write log memory 18B as indicated by a block 69.

The above embodiment assumes that logs 34 includes separate read and write logs 34W and 34R for each executing block 20 and that the number of write log entries 52 is likely to be low because blocks 20 in STM code 12 typically perform more read accesses than write accesses and the nature of the encoding of compressed transactional locks 46A provides perfect filtering.

STM system 10 operates with each compressed transactional lock 46A in a header 42 as long as the header 42 is not needed by the operating system and/or runtime environment 16 for another use and as long as preferred write log memory 18A is not full (i.e., preferred write log memory 18A has unused memory that may be used for additional write log entries 52). If a header 42 is needed by the operating system and/or runtime environment 16 for another use or preferred write log memory 18A becomes full, then uncompressed transactional locks 72 are used.

Figure 4A:
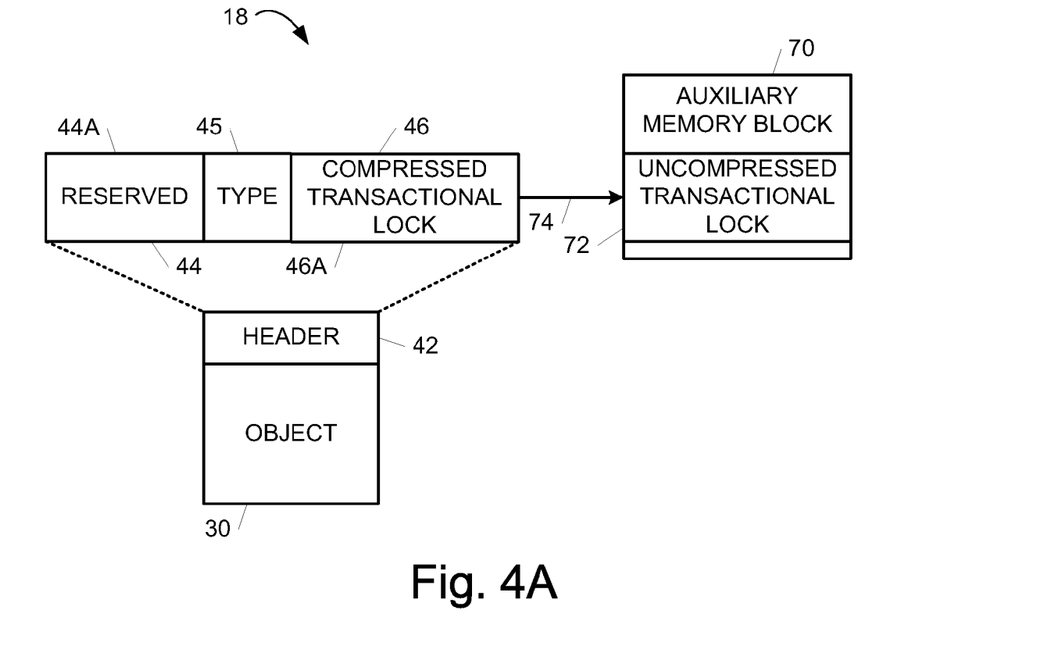
FIGS. 4A-4B are block diagrams illustrating embodiments of moving a compressed transactional lock to an auxiliary memory.
Figure 4B:
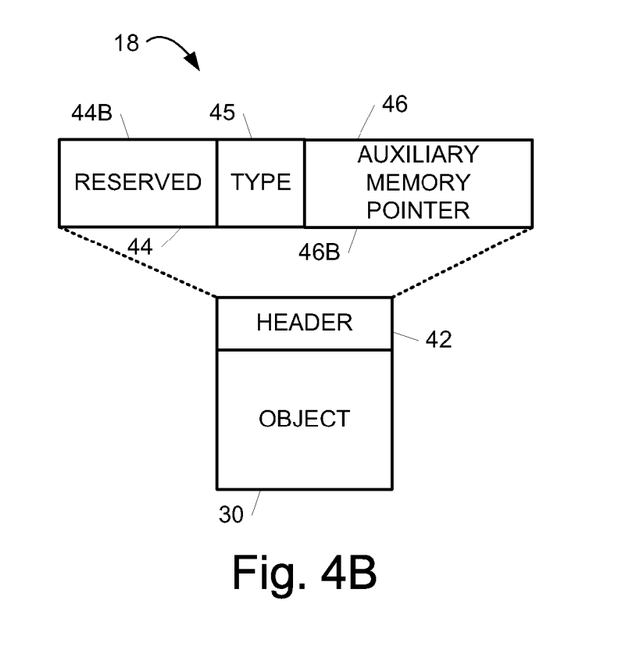
Figure 5:
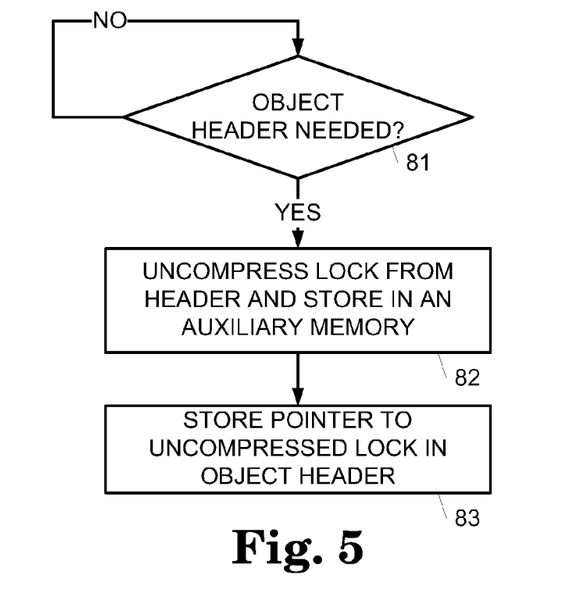
FIG. 5 is a flow chart illustrating an embodiment of a method for moving a compressed transactional lock to auxiliary memory

If a header 42 is needed by the operating system and/or runtime environment 16 for another use, then a compressed transactional lock 46A, if present in header 42, is uncompressed and moved to an auxiliary memory block 70 as shown in the embodiments of FIGS. 4A-4B and 5. FIGS. 4A-4B are block diagrams illustrating embodiments of moving a compressed transactional lock 46A to an auxiliary memory block 70 in memory system 18, and FIG. 5 is a flow chart illustrating an embodiment of a method for moving a compressed transactional lock 46A to an auxiliary memory block 70 as performed by STM system 10.

If, during the execution of STM code 12, STM system 10 determines that a header 42 is needed by the operating system and/or runtime environment 16 for another use, as indicated in a block 81, STM system 10 uncompresses compressed transactional lock 46A from header 42, if present, and stores the uncompressed transactional lock 72 in auxiliary memory block 70 as indicated in a block 82. As shown in FIG. 4A, compressed transactional lock 46A is converted to uncompressed transactional lock 72 and moved to auxiliary memory block 70 as indicated by an arrow 74. The operating system and/or runtime environment 16 adds information corresponding to the other use (not shown) to auxiliary memory block 70.

In one embodiment, STM system 10 generates the uncompressed transactional lock 72 by adding base address 56 of preferred write log memory 18A to the compressed transactional lock 46A. In the embodiment where encoded pointer includes 25 bits, then STM system 10 generates the uncompressed transactional locks 72 to include 32 bits. In other embodiments, STM system 10 generates the uncompressed transactional lock 72 using other functions of base address 56 and the address of the corresponding write log entry 52 and/or generates the uncompressed transactional locks 72 to include other numbers of bits.

STM system 10 stores an auxiliary memory pointer 46B in header 42 as indicated in a block 83. As shown in FIG. 4B, auxiliary memory pointer 46B replaces compressed transactional lock 46A in header 42. STM system 10 also sets type indicator 45 to indicate that portion 46 now includes an auxiliary memory pointer 46B.

By moving compressed transactional lock 46A out of header 42, header 42 may store an auxiliary memory pointer 46B to allow operating system and/or runtime environment 16 to store information (not shown) in auxiliary memory block 70. In addition, the uncompressed transactional lock 72 allows a corresponding write lock entry 52 to be stored in additional write log memory 18B (i.e., outside of preferred write log memory 18A).

In the above embodiments, the write locks embodied by compressed transactional locks 46A may be stored in an efficient and convenient location (i.e., headers 42) for most implementations of STM code 12. For the remaining implementations of STM code 12, the above embodiments provide an alternate mechanism (i.e., auxiliary memory block 70) for the transactional locks.

In the above embodiments, STM library 14 is configured to cooperate with the operating system and/or runtime environment 16 when reading or writing a transactional lock that may be compressed into an object header 42. A protocol and/or synchronization may be established between STM library 14, the operating system, and/or runtime environment 16 to account for uses of object headers 42 by the operating system and/or runtime environment 16. Any such protocol and/or synchronization may be abstracted from STM library 14 by providing calls from STM library 14 to the operating system and/or runtime environment 16 to get a transactional lock, set a transactional lock unconditionally, or perform a compare and swap (CAS) operation on the transactional lock. STM library 14 may be configured to access transactional locks using only these calls, and these calls may hide the specific location of the transactional locks and the method of compression of the transactional locks from STM library 14. In addition, STM library 14 may be configured to not attempt to understand or track the location of a transactional lock in memory system 18. The calls to access a transactional lock are all based on the address of objects 30 and not on the specific location of a transactional lock in memory system 18.

Figure 6:
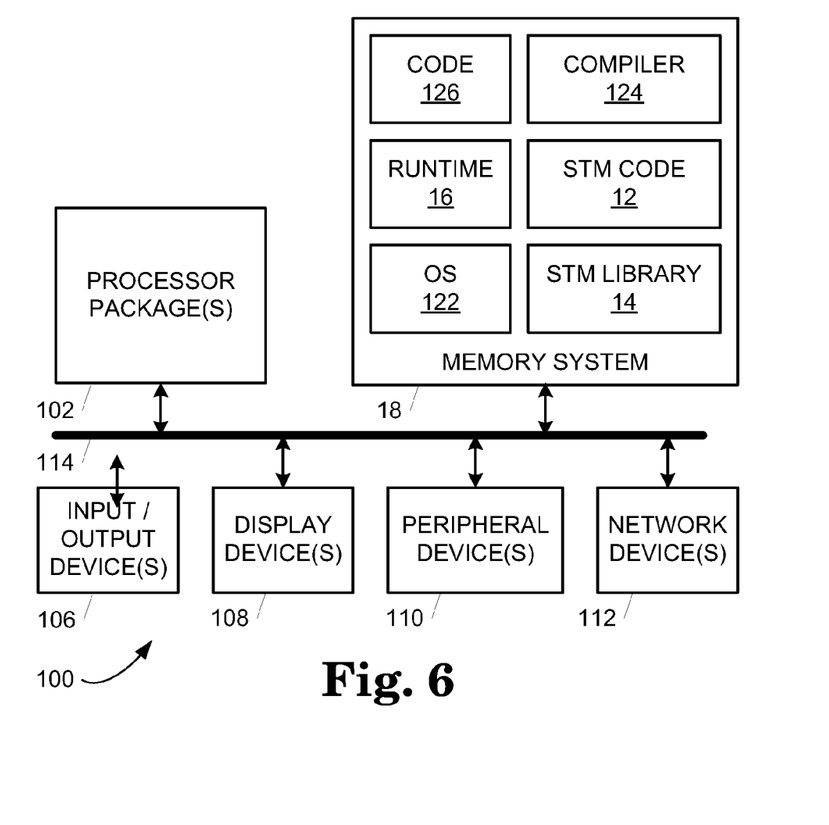
FIG. 6 is a block diagram illustrating an embodiment of a computer system configured to implement a software transactional memory system that uses compressed transactional locks.

FIG. 6 is a block diagram illustrating an embodiment of a computer system 100 configured to implement STM system 10 that uses compressed transactional locks.

Computer system 100 includes one or more processor packages 102, memory system 18 (also shown in FIGS. 2A-2C), zero or more input/output devices 106, zero or more display devices 108, zero or more peripheral devices 110, and zero or more network devices 112. Processor packages 102, memory system 18, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 18, input/output devices 106, display devices 108, peripheral devices 110, network devices 112, and interconnections 114) may be contained in a common housing (not shown) or in any suitable number of separate housings (not shown).

Processor packages 102 each include one or more execution cores. Each execution core is configured to access and execute instructions stored in memory system 18. The instructions may include a basic input output system (BIOS) or firmware (not shown), OS 122, STM code 12, STM library 14, runtime environment 16, a compiler 124, and code 126. Each execution core may execute the instructions in conjunction with or in response to information received from input/output devices 106, display devices 108, peripheral devices 110, and/or network devices 112.

Computer system 100 boots and executes OS 122. OS 122 includes instructions executable by execution cores to manage the components of computer system 100 and provide a set of functions that allow programs to access and use the components. OS 122 executes runtime environment 16 to allow STM code 12 and STM library to be executed. In one embodiment, OS 122 is the Windows operating system. In other embodiments, OS 122 is another operating system suitable for use with computer system 100.

Computer system 100 executes compiler 124 to generate STM code 12 from code 126. Compiler 12 accesses or otherwise receives code 126 and transforms code 126 into STM code 12 for execution by computer system 100. Compiler 12 performs any desired conversion of the set of instructions of code 126 into a set of instructions that are executable by computer system 100 and includes the set of instructions in STM code 12. Compiler 12 also identifies blocks 20 in code 126 from transaction designators 22 and modifies blocks 20 in STM code 12 to include invocations of STM primitives 26.

In one embodiment, compiler 124 includes a just-in-time (JIT) compiler that operates in computer system 100 in conjunction with OS 122, runtime environment 16, and STM library 14. In another embodiment, compiler 124 includes a stand-alone compiler that produces STM code 12 for execution on computer system 100 or another computer system (not shown).

Code 126 may be any suitable source code written in a language such as Java or C#, any suitable bytecode such as Common Intermediate Language (CIL), Microsoft Intermediate Language (MSIL), or Java bytecode, or specific processor instructions.

As noted above, memory system 18 includes any suitable type, number, and configuration of volatile or non-volatile storage devices configured to store instructions and data. The storage devices of memory system 18 represent computer readable storage media that store computer-executable instructions including STM code 12, STM library 14, runtime environment 16, OS 122, compiler 124, and code 126. Memory system 18 stores instructions and data received from processor packages 102, input/output devices 106, display devices 108, peripheral devices 110, and network devices 112. Memory system 18 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed in a computer system, the method comprising:
   allocating a preferred write log memory with a predefined size of memory at a base address in a software transactional memory (STM) system;
   generating, with the STM system, a compressed transactional lock from the base address of the preferred write log memory and an address of a write log entry in the preferred write log memory in response to a call that opens an object for writing, the compressed transactional lock including an encoded pointer that identifies the write log entry in the preferred write log memory and a type indicator indicating whether that the compressed transactional lock is a write lock;
   storing, with the STM system, the compressed transactional lock into a first portion of a header of the object;
   generating, with the STM system, an uncompressed transactional lock from the compressed transactional lock and the base address in response to the header being accessed for another use, the uncompressed transactional lock identifying a corresponding write log entry in an additional write log memory;
   storing, with the STM system, the uncompressed transactional lock into an auxiliary memory;
   storing, with the STM system, an auxiliary pointer in the first portion of the header in place of the compressed transactional lock, the auxiliary pointer configured to locate the uncompressed transactional lock; and
   storing, with the STM system, a type indicator in the header to indicate whether the first portion of the header stores the compressed transactional lock or the auxiliary pointer.

2. The method of claim 1 further comprising:
   creating the write log entry corresponding to the compressed transactional lock.

3. The method of claim 1 further comprising:
   generating the compressed transactional lock as a difference between the base address of the preferred write log memory and the address of the write log entry.

4. The method of claim 1 wherein the predefined size of memory corresponds to a first number of bits in the compressed transactional lock, and wherein a second number of bits in the uncompressed transactional lock is greater than the first number of bits.

5. The method of claim 1 further comprising:
   storing the compressed transactional lock into the header in response to the header being available for use by the STM system.

6. The method of claim 1 further comprising:
   allocating the additional write log memory in response to the preferred write log memory becoming full.

7. A computer readable storage medium storing computer-executable instructions that, when executed by a computer system, perform a method comprising:

generating, with a software transactional memory (STM) system, an uncompressed transactional lock from a compressed transactional lock stored in a first portion of a header of an object and a base address of a preferred write log memory, the compressed transactional lock corresponding to a call that opens the object for writing in the STM system, and the compressed transactional lock generated, with the STM system, from the base address of the preferred write log memory and an address of a write log entry in the preferred write log memory, the compressed transactional lock including an encoded pointer that identifies the write log entry in the preferred write log memory and a type indicator indicating whether that the compressed transactional lock is a write lock, the uncompressed transactional lock identifying a corresponding write log entry in an additional write log memory;

storing, with the STM system, the uncompressed transactional lock into an auxiliary memory;

storing, with the STM system, an auxiliary pointer in the first portion of the header in place of the compressed transactional lock, the auxiliary pointer configured to locate the uncompressed transactional lock; and storing, with the STM system, a type indicator in the header to indicate whether the first portion of the header stores the compressed transactional lock or the auxiliary pointer.

8. The computer readable storage medium of claim 7, the method further comprising:

moving the compressed transactional lock from the header to the auxiliary memory in response to the header being accessed for another use.

9. The computer readable storage medium of claim 7, wherein the preferred write log memory has a predefined size of memory that corresponds to a first number of bits in the compressed transactional lock, and wherein a second number of bits in the uncompressed transactional lock is greater than the first number of bits.

10. The computer readable storage medium of claim 7, the method further comprising:

storing the compressed transactional lock in the header prior to generating the uncompressed transactional lock.

11. A method performed in a computer system, the method comprising:

generating, with a software transactional memory (STM) system, a compressed transactional lock by subtracting a base address of a preferred write log memory from an address of a write log entry in the preferred write log memory in the STM system in response to a call that opens an object for writing, the preferred write log memory having a first predefined size of memory that corresponds to a first number of bits in the compressed transactional lock, the compressed transactional lock including an encoded pointer that identifies the write log entry in the preferred write log memory and a type indicator indicating whether that the compressed transactional lock is a write lock;

storing, with the STM system, the compressed transactional lock into a first portion of a header of the object;

generating, with the STM system, an uncompressed transactional lock by adding the compressed transactional lock and the base address in response to the header being accessed for another use, the uncompressed transactional lock having a second number of bits that is greater than the first number of bits, the uncompressed transactional lock identifying a corresponding write log entry in an additional write log memory;

storing, with the STM system, the uncompressed transactional lock into an auxiliary memory;

storing, with the STM system, an auxiliary pointer in the first portion of the header in place of the compressed transactional lock, the auxiliary pointer configured to locate the uncompressed transactional lock; and storing, with the STM system, a type indicator in the header to indicate whether the first portion of the header stores the compressed transactional lock or the auxiliary pointer.

12. The method of claim 11 wherein the header has a second predefined memory size, and wherein the compressed transactional lock has a third predefined memory size that is smaller than the second predefined memory size.

13. The method of claim 11 further comprising:

allocating the additional write log memory in response to the preferred write log memory becoming full.

* * * * *